United States Patent [19]
Dinh et al.

[11] Patent Number: 6,076,170
[45] Date of Patent: *Jun. 13, 2000

[54] METHOD AND APPARATUS FOR SELECTIVELY PROGRAMMING ACCESS TIME IN A DATA PROCESSOR

[75] Inventors: Khoi Van Dinh; Clinton Thomas Glover; Matthew Russell Nixon, all of Austin, Tex.

[73] Assignee: Motorola, Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/711,517

[22] Filed: Sep. 16, 1996

[51] Int. Cl.[7] .................................................. G06F 1/04
[52] U.S. Cl. .......................................... 713/500; 713/600
[58] Field of Search .................................. 395/551, 552, 395/556, 558, 559, 560, 309, 555

[56] References Cited

U.S. PATENT DOCUMENTS

| | | | |
|---|---|---|---|
| 5,383,161 | 1/1995 | Sanemitsu | 365/230 |
| 5,432,468 | 7/1995 | Moriyama et al. | 395/556 |
| 5,485,589 | 1/1996 | Kocis et al. | 395/421 |
| 5,491,814 | 2/1996 | Yee et al. | 395/550 |

OTHER PUBLICATIONS

D.Mills, et al., "TA 7.I: A 3.3V 50MHz Synchronous 16Mb Flash Memory", IEEE/1995 ISSCC Slide Supplement, pp. 1–4.

Johnny K.F.Lee et al., "Branch Prediction Strategies and Branch Target Buffer Design", Jan. 1984, pp. 6–20.

*Primary Examiner*—Dennis M. Butler

[57] ABSTRACT

In a data processing system, a memory control unit (22) provides a control register bit field (60), logic, and a state machine (62) which facilitate a programmable number of clocks for an initial access to an on-chip memory (20). Specifically, the memory control unit (22) allows an external user to modify memory control signals to provide consistent access times across different frequencies of the system clock and allows memory control signals to be modified to optimize access time dynamically. Also, programmable control of the control signals to the memory (20) allows the memory to operate at system clock frequencies which are higher than expected.

8 Claims, 9 Drawing Sheets

| HIT INDICATOR | SEQUENTIAL INDICATOR | ADDRESS | DATA |
|---|---|---|---|
| 0 | 0 | 00 | D1 |
| 0 | 1 | 04 | D2 |
| 0 | 1 | 08 | D3 |
| 0 | 1 | 0C | D4 |
| 0 | 1 | 10 | D5 |
| 0 | 0 | 04 | D2 |
| 0 | 1 | 08 | D3 |
| 0 | 1 | 0C | D4 |
| 1 | 0 | 00 | D1 |
| 1 | 1 | 04 | D2 |
| 0 | 1 | 08 | D3 |
| 0 | 0 | 18 | D9 |

*FIG.9*

METHOD AND APPARATUS FOR SELECTIVELY PROGRAMMING ACCESS TIME IN A DATA PROCESSOR

CROSS REFERENCE TO A RELATED, CO-PENDING APPLICATION

This application is related to a commonly assigned co-pending patent application entitled, "Interface Queue Apparatus and Method Therefor" by Joseph C. Circello, et al., Attorney Docket No. SC90215A and filed concurrently herewith.

FIELD OF THE INVENTION

The present invention relates, in general, to a data processor, and more particularly to a method and apparatus for performing an access operation in the data processor.

BACKGROUND OF THE INVENTION

As data processors are required to run at continually increasing frequencies, circuits previously adequate to perform a given function are no longer able to perform at the increased operating frequencies and thus become obsolete for use. In one example, memories are often integrated together with a central processing unit (CPU) allowing for efficient CPU execution of operations by reducing the number of required external accesses associated with a given access. Over time, memories which were once designed to operate at similar frequency to the CPU are now functioning at substantially lower frequencies. Though new memories with increased speed capabilities are also being developed, it is often desirable to maintain the slower memories in a data processor to reduce overhead costs associated with designing and implementing the new faster memories. However, other issues often arise as to the compatibility of the memory with a new clock provided in the data processor.

Specifically, memory systems are designed with a specific access time requirement. During an access a memory system typically requires a predetermined time to decode, precharge, sense, and output an appropriate data value. Operation outside of the predetermined time may result in the memory system providing erroneous data which can not be used by the data processor. To avoid this problem, memory systems have been developed which utilize self-timed memories. Such a prior art system is demonstrated in FIG. 1.

Self-timed memories, although independent of the system clock frequency, are dependent on the processing and physical layout of the memory system. Additionally, self-timed memories typically require additional design time and silicon area. In memory systems which are controlled by the system clock or some derivative thereof, the predetermined access times are independent of processing and physical layout; the present invention addresses the latter type of memory systems.

Figure 1:
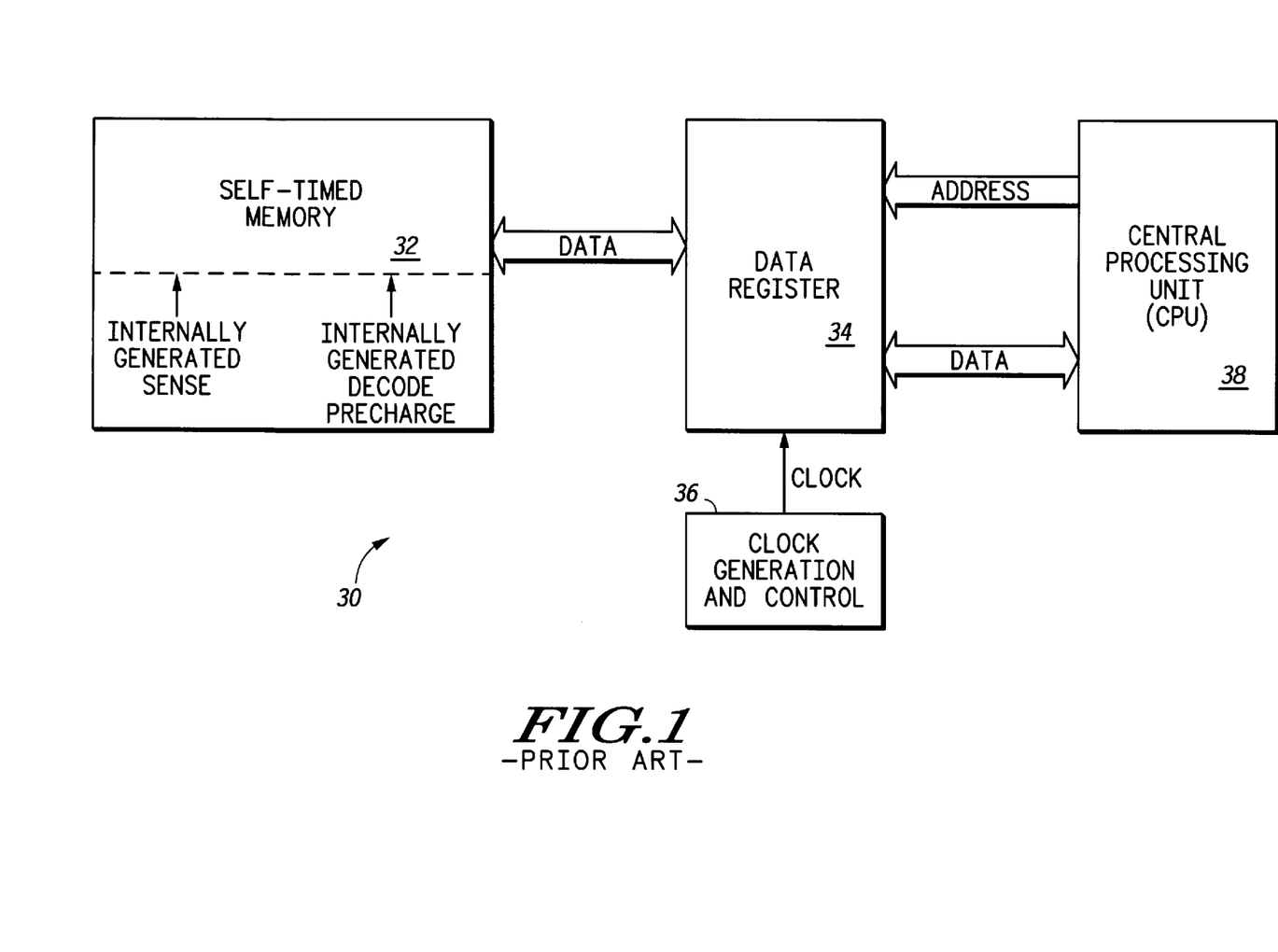
FIG. 1 illustrates, in block diagram form, a prior art implementation of a data processor having a self-timed memory.

In FIG. 1, a self-timed memory 32 is controlled by internally generated control signals, examples of such internally generated signals include an internally generated sense signal, an internally generated decode, and a precharge signal. As each of these signals and other control signals not illustrated in detail herein is generated in response to a predetermined time period, self-timed memory 32 is only able to provide correct data at a fixed time interval. This data is provided to data register 34 where it is stored until a pre-selected number of clock periods passes. The pre-selected number of clock periods is determined by an external user and programmed in clock generation and control circuit 36. From data register 34, the data is passed at an appropriate time to central processing unit (CPU) 38.

Assuming that the prior art communication system 30 is synchronous, CPU 38 is required to sample the data bus at predetermined clock edges. Therefore, when CPU 38 is operating at a faster frequency than self-timed memory 32, data register 34 is necessary to provide stable data between selftimed memory 32 and CPU 38. Although the prior art implementation illustrated in FIG. 1 provides a useful implementation for insuring the validity of data transferred between self-timed memory 32 and CPU 38, the prior art implementation illustrated fails to facilitate the operation of a memory array at frequencies which are beyond design expectations.

For instance, if the sense and decode precharge signals provided to self-timed memory 32 were not generated and controlled internally and such signals were provided at a frequency which was higher than the design frequency of self-timed memory 32, the access time would not be sufficient for self-timed memory 32 to output valid data. Therefore, even with data register 34, correct data would not be transferred between self-timed memory 32 and CPU 38. This result occurs because self-timed memory 32 has a fixed access time across system clock frequencies.

In a second prior art implementation, consider a first case where the memory system is actually operating at a higher frequency than the CPU. Additionally, consider a second case where software code from an external memory is being ported to on-chip memory; it is desired to slow on-chip memory to emulate a longer access time associated with the external memory. In both cases, the second prior art implementation inserts wait states to accomodate timing sensitive portions of software such that the latency of on-chip operation matches the latency of externally accessed memory. The wait states are inserted prior to on-chip memory access. Again, while this provides a useful solution in some situations, the second prior art implementation also does not facilitate accesses to an on-chip memory at frequencies higher than design expectations.

In a third prior art implementation, control for a non-volatile memory is provided by a fixed algorithm. During a code verification process, control signals for the memory are slowed by a fixed amount when the data processor implementing the non-volatile memory is placed in a special mode of operation. An example is illustrated in the verify operation of the MC68HC908XL36 manufactured by Motorola of Austin, Tex. Again, such control of an on-chip memory, is done only when the data processor is in a special mode of operation and does not allow for flexible control thereof.

Therefore, a need exists for a data processing system which allows for flexible control of a memory to compensate for increased or decreased operating frequencies of a system dock for a data processing system in which the memory is implemented.

Additionally, when memories are implemented in a data processor, an initial access of that memory may require more than one clock cycle. In an application where processing speed and efficiency are paramount, it is desirable to minimize access time required to on-chip memory. A current objective in the data processing industry is to provide a single-docked access to on-chip multi-cycle memory.

Some prior art implementations achieve the aforementioned objective by using interleaved on-chip memory. However, even the initial access to an interleaved multi-cycle memory may still require multiple dock cycles. With the current trend toward integration of system components on-chip and the use of multi-cycle memories thereon, the need to have an initial access to the memory which requires only a single clock is becoming more important.

BRIEF DESCRIPTION OF THE DRAWINGS

FIG. 4-A illustrates, in flow diagram form, a plurality of steps executed by an interface state machine of the memory interface unit of FIG. 3;

FIG. 4-B illustrates, in flow diagram form, a second embodiment of a plurality of steps executed by the interface state machine of the memory interface unit of the present invention;

DESCRIPTION OF THE PREFERRED EMBODIMENTS

The present invention provides a data processor and method of operating the data processor which allows a user extensive flexibility in selecting from a variety of memory devices which will interface with a central processing unit (CPU) of the data processor. In a first portion of the present invention, a control register bit is implemented, together with logic, to facilitate a programmable number of clocks for an initial access to an on-chip memory.

For data processor communication with on-chip memory, the data processor uses a control register bit or bit field to allow a user to selectively modify control signals provided to on-chip memory in order to provide consistent periods of time for accessing data from the on-chip memory over a range of data processor system dock frequencies. This register bit field effectively allows the control signals provided to the on-chip memory to be implemented under software control. The selective modification of these access times is especially useful as it allows the implementation of modular designs which may be reused in subsequent designs without substantial overhead cost.

Additionally, the selective modification of memory access time allows software code, ported from an external memory to on-chip memory, to be correctly executed. The benefit is key for timing sensitive operations. One embodiment of the present invention utilizes a control register bit field and logic to provide control signals which may be selectively modified to optimize an access time to a memory. Programmability allows access times to be varied dynamically, however at any given instant in time, only a single access time is supported. Such dynamic control allows the data processing system flexibility consistent with design and operational demands.

DESCRIPTION OF OPERATION OF MEMORY INTERFACE UNIT

Figure 2:
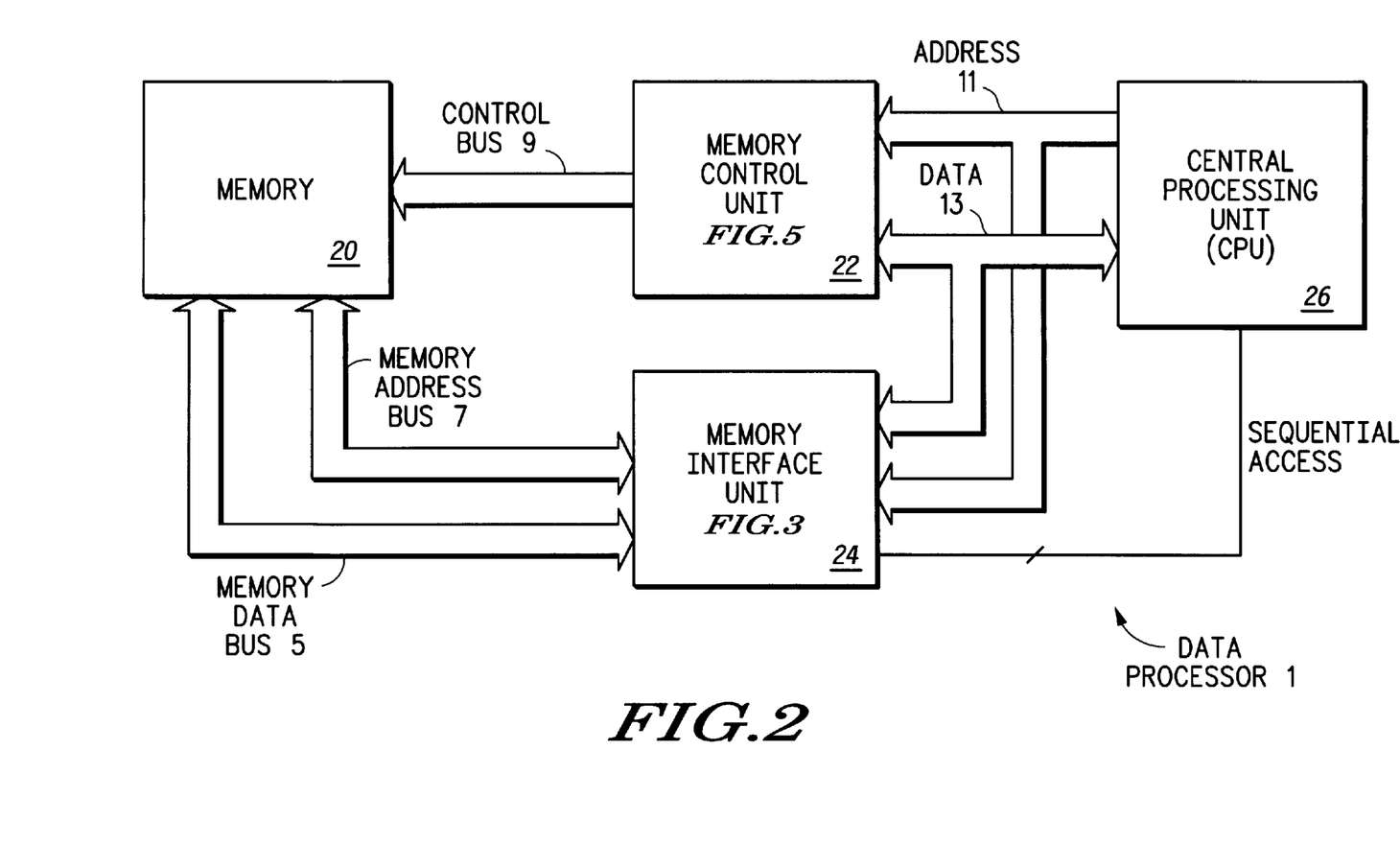
FIG. 2 illustrates, in block diagram form, a data processor in accordance with one embodiment with the present invention.
Figure 3:
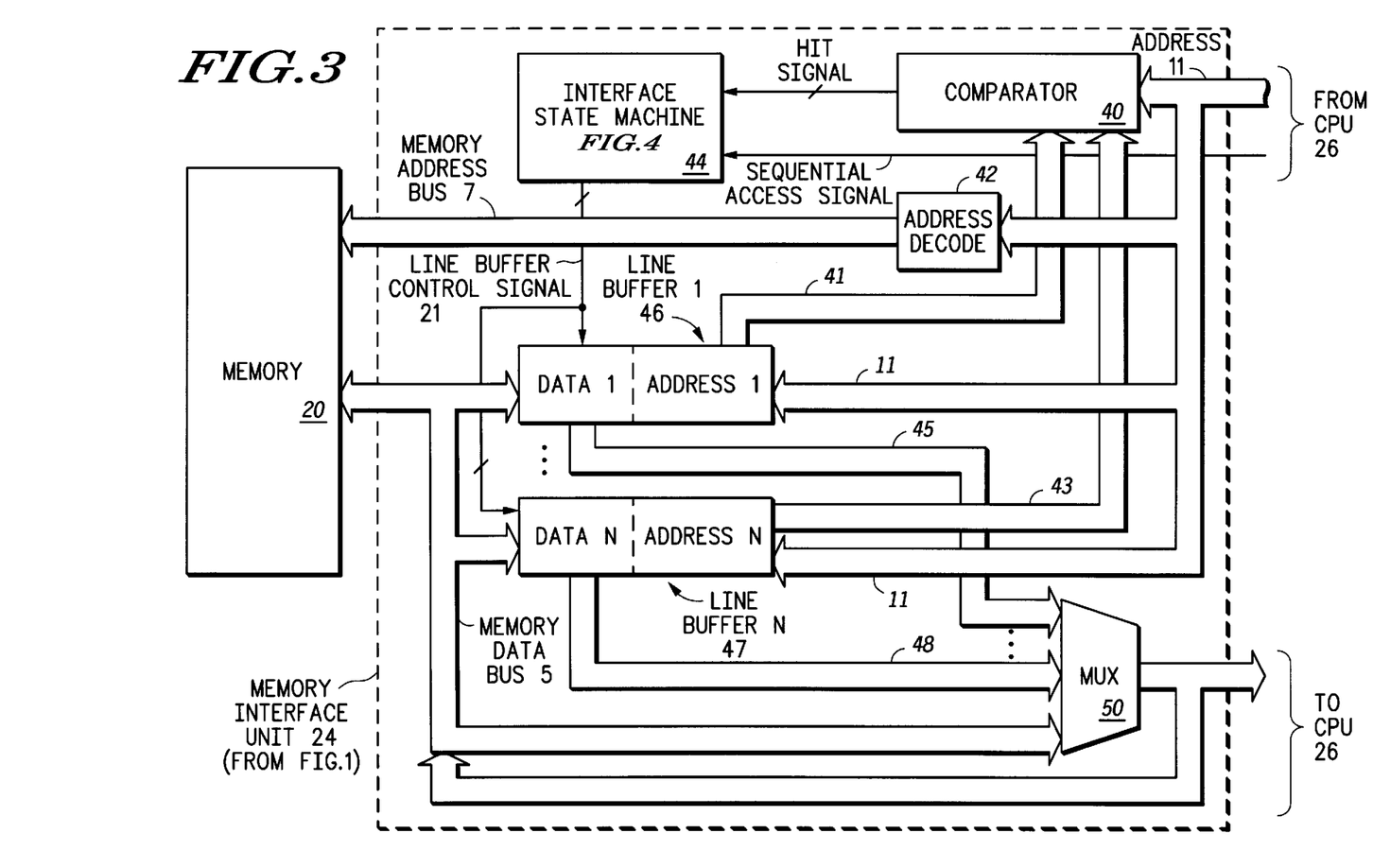
FIG. 3 illustrates, in block diagram form, a memory interface unit of the data processor of FIG. 2 in accordance with one embodiment of the present invention.

One embodiment of the present invention is illustrated in FIGS. 2–3, where CPU 26 interfaces with memory 20 through memory interface unit 24 and controls memory 20 through memory control unit 22. For CPU 26 access of a data value for use during a data processing operation, CPU 26 initiates such an access by providing address information via address bus 11 to memory interface unit 24 to indicate an address of the data value to be accessed. Once provided to memory interface 24, the address on address bus 11 is provided to comparator 40, address decode 42, line buffer 46 and line buffer 47.

In comparator 40, the address provided by address bus 11 is compared with a first stored address in line buffer 46 and a second stored address in line buffer 47. When the address provided by address bus 11 corresponds to any address stored in the plurality of line buffers 46–47 it constitutes a match. In response to occurence of a match, comparator 40 asserts a multi-bit match or hit signal. It should be noted that the present invention may implement either one or a plurality of line buffers such as line buffer 47 and line buffer 46.

Figure 4:
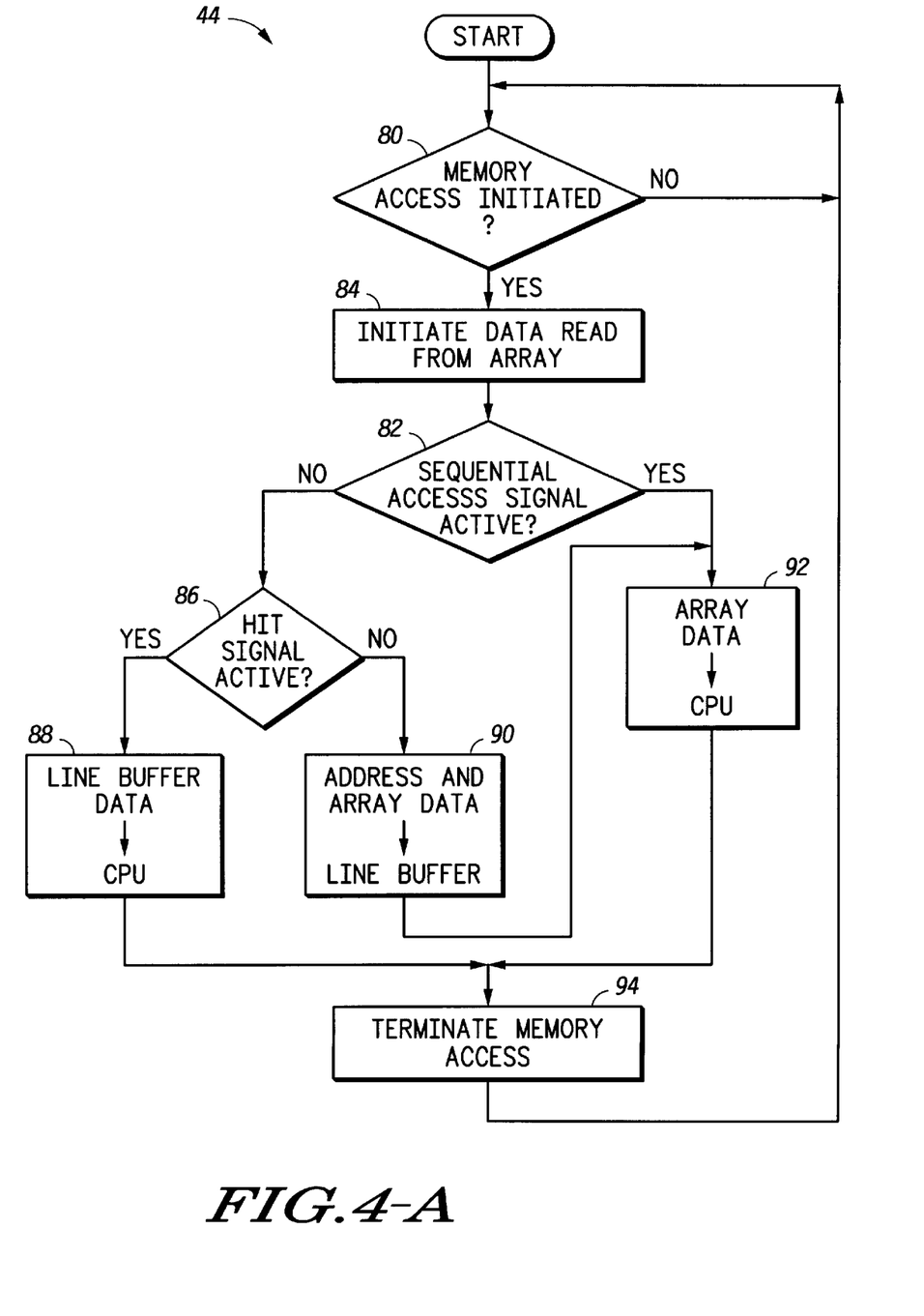

In addition to providing address information via address bus 11, CPU 26 also provides a sequential address signal to interface state machine 44. This sequential address signal indicates whether or not the address provided by address bus 11 is sequential in nature or reflects a change in the programming flow executed by CPU 26. In the present embodiment of the invention, the sequential access signal is asserted when the address transferred via address bus 11 is a next, sequential address value. Typically an operating instruction which requires the CPU to branch or jump to the next address violates the sequential programming order executed by the CPU. If the address transferred via address bus 11 indicates that there is a change of flow in the program, such as a branch operation, the sequential access signal is negated. Both the hit signal and the sequential access signal are provided to interface state machine 44. The interface state machine 44 provides the multi-bit line buffer control signal for controlling when information is stored in each of the plurality of line buffers 46–47. Operation of interface state machine 44 is described in alternate embodiments illustrated in FIG. 4-A and FIG. 4-B.

In response to the multi-bit line buffer control signal, line buffer 46 may be selectively enabled to store an address value provided by address bus 11 and a data value provided by memory data bus 5. It should be noted that the value provided by address bus 11 is provided to address decode circuit 42, where it is decoded and provided to memory 20 via memory address bus 7. Memory 20 subsequently accesses the data corresponding to the address transferred via memory address bus 7 to provide that data via memory data bus 5. It is this data that is stored, together with the address value transferred via address bus 11, in line buffer 46. Similarly, the line buffer control signal may enable line buffer 47 for a write of data, the data corresponding to the address value transferred via address bus 11.

The data value stored in each of line buffers 46–47 are provided to multiplexer 50, together with a value transferred via memory data bus 5. Interface state machine 44 provides control (not illustrated herein) to multiplexer 50 to indicate which data value should be provided to CPU 26 corresponding to an address value transferred via address bus 11. The previous example of operation being a simplistic exemplar, a more detailed description of operation will be discussed with reference to both FIG. 4-A and FIG. 4-B.

FIG. 4-A illustrates the steps executed by interface state machine 44 in greater detail. In a first step 80, interface state machine 44 determines whether or not a memory access has been initiated by CPU 26. If a memory access operation has not been initiated, interface state machine 44 continues to wait until CPU 26 initiates an access operation. If a memory access operation has been initiated, interface state machine 44 initiates a data access from memory array 20 in step 84. If a sequential access signal is asserted in step 82, data from memory 20 is provided to CPU 26 in step 92. When the sequential access signal is asserted to indicate that a sequential address value is being accessed from memory 20, data and address information is not written into either a line buffer 46 or line buffer 47.

If the sequential access signal is not asserted in step 82, interface state machine 44 then determines whether or not the hit signal has been asserted in step 86. If the hit signal has been asserted to indicate that the accessed address value is stored in one of the plurality of line buffers 46–47, data is provided from an appropriate one of the plurality of line buffers 46–47 to multiplexer 50 in step 88. Also in step 88, multiplexer 50 subsequently transfers the data value to CPU 26. The interface state machine 44 then moves to step 94 to terminate the memory access.

Alternatively, if the sequential access signal is not asserted in step 82, and interface state machine 44 then determines the hit signal is not asserted in step 86 (i.e. not a sequential access and the address provided by address bus 11 does not match an address stored in any of the plurality of line buffers 46–47), the address value transferred via address bus 11 is stored in an appropriate one of the plurality of line buffers 46–47 in step 90. Note that the appropriate one of the plurality of line buffers 46–47 is selected by the line buffer control signal 21 (see FIG. 3). Similarly, also in step 90, data provided by memory 20 via memory data bus 5 is stored in the appropriate one of the plurality of line buffers 46–47. This storage step occurs in a step 90. Interface state machine 44 then proceeds to step 92. Basically if the hit signal is not asserted on a non sequential access, memory 20 is accessed under control of interface state machine 44 and the data is routed onto data bus 5, through multiplexor 50 and back to CPU 26 via data bus 13. It should be noted that steps 90 and 92 may be executed concurrently.

After execution of each of steps 88 or 92, the memory access is terminated in step 94 and interface state machine 44 returns to its initial step 80 to determine whether or not a memory access has been initiated.

Thus, from FIG. 4-A, it may be observed that the one embodiment of the present invention provides a methodology for selectively implementing a memory access operation for instructions or data to be provided to CPU 26. In one embodiment, first state machine 44 selectively controls the values stored in each of line buffers 46–47 to ensure that data is ready and may be quickly accessed for use in a data processing operation executed by CPU 26. An example of the operation executed by the present invention will subsequently be described in greater detail.

FIG. 4-B provides a second implementation of the present invention. In the implementation of the invention which requires the steps of FIG. 4-B, the data value to be stored includes a plurality of data words. In the present embodiment of the invention, the data value effectively includes two long words of information.

The steps executed by interface state machine 44 when the data value provided by memory 20 is a plurality of values, is illustrated in greater detail in FIG. 4-B. In a first step 200 of FIG. 4-B, interface state machine 44 determines whether or not a memory access has been initiated. If no memory access has been initiated, interface state machine 44 remains in step 200 until CPU 26 initiates an access to memory 20. If a memory access operation has been initiated, a data read is initiated from memory 20 in a step 204. In step 202 interface state machine 44 determines whether or not a sequential access signal has been asserted by CPU 26. If the sequential access signal has been asserted in step 202, data access for memory 20 is provided to CPU 26 via memory data bus 5 in step 212. Subsequently, the memory access operation is terminated in step 228 and interface state machine 44 returns to its initial state 200.

If the sequential access signal was not asserted in step 202, interface state machine 44 determines whether or not the multi-bit hit signal has been asserted in step 206. If the hit signal has been asserted, data is accessed from a corresponding one of the plurality of line buffers 46–47 in step 208. Note that the corresponding one of the plurality of line buffers 46–47 is one which stores an address value that matches the address value transferred via address bus 11. The data stored in the corresponding one of the plurality of line buffers 46–47 is provided to multiplexer 50 which subsequently provides the data to CPU 26 under the control of interface state machine 44, also in step 208. Subsequently, interface state machine 44 determines whether or not the corresponding one of the plurality of line buffers 46–47 has more buffer capacity in a step 214. If the access line buffer does not have additional capacity, the memory access operation is terminated in step 228 and the interface state machine 44 returns to its initial step 200.

However, if the access line buffer does have additional capacity, interface state machine 44 again determines whether or not a sequential access signal is asserted in step 218. If the subsequent sequential access signal is not asserted in step 218 (i.e. the next address is not a subsequent address and the processing order has been changed), interface state machine 44 returns to a step 204 where a data read operation is initiated in step 204 to access the data value corresponding with the address provided by CPU 26. If the sequential access signal is asserted in step 218 (i.e. the next address is a subsequent sequential address in the processing flow), the data stored in the additional portion of the line buffer is provided to multiplexer 50 where it is subsequently passed to CPU 26 under the control of interface state machine 44 in step 222. Note that after completing step 222, interface state machine 44 returns to step 214 to determine if there is still more line buffer capacity.

Returning again to step 206, if the hit signal is not asserted, address information provided by address bus 11 is stored in one of the plurality of line buffers 46–47 indicated by line buffer control signal 21. Additionally, corresponding data accessed from memory 20 is provided to CPU 26 and is also stored in the one of the plurality of line buffers 46–47 accessed by interface state machine 44 through line buffer control signal 21.

Subsequently, interface state machine 44 determines whether or not the accessed one of the plurality of line buffers 46–47 has more line buffer capacity in step 216. If not, the memory access operation is terminated in step 228 and interface state machine 44 returns to an initial state 200. If there is additional capacity, it is then determined, in a step 220, whether or not the sequential access signal is asserted. It should be noted that step 220 is an optional step. If the sequential access signal is not asserted, a data read operation is initiated from memory 20 in step 204. If the sequential access signal is asserted, data to be stored in the additional buffer capacity is read from memory 20 via memory data bus 5 in step 224. Subsequently, the data read from memory 20 is stored in the accessed one of the plurality of line buffers 46–47 in a step 226. After step 226 is completed, interface state machine 44 returns state flow to step 216.

Figure 9:
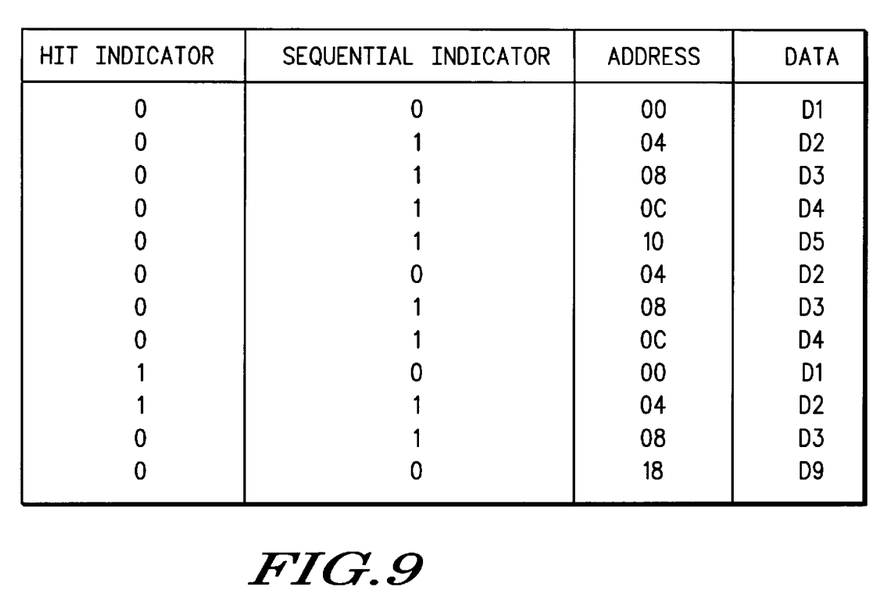
FIG. 9 illustrates, in table form, a second example of operation of one embodiment of the present invention.

An example of operation of memory interface unit 24 is subsequently illustrated in FIG. 9. FIG. 9 provides a table which includes resultant conditions after execution of interface state machine in compliance with FIG. 4-A, and serves as an example of code execution according to one embodiment of the present invention.

FIG. 9 illustrates an example of execution of data processor 1, illustrated in FIG. 2, according to one embodiment of the present invention. The processing flow is in order from top down.

Starting in the first row, address 00 is assumed to be the initial address provided by CPU 26. Memory 20 has data d1 stored in address 00. CPU 26 provides address 00 to memory interface unit 24, and specifically to comparator 40. Comparator 40 looks for a match between address 00 and the addresses stored in line buffers 46–47. The corresponding hit indicator is 0, indicating that the hit signal provided by comparator 40 is negated. Negation of the hit signal indicates the address 00 is not stored in any one of the plurality of line buffers 46 and 47. Continuing across the first row, notice that the sequential indicator is 0, indicating that the sequential access signal is negated. The first row represents the intiation of processing and therefore, is treated as if it were a change in operation flow. At this point, no data is stored in any of the plurality of line buffers 46–47, therefore, no data is available for access from any of the plurality of line buffers 46–47. Interface state machine 44 recognizes an initialization step as a change in flow and subsequently stores data d1 from address 00 in memory 20 to line buffer 46. This example of operation starts with line buffer 46, however alternate embodiments may start with any one of the plurality of line buffers 46–47. Prior to initialization (until the first write of d1 to line buffer 46), no valid data is stored in any of the plurality of line buffers 46–47.

The next row illustrates sequential processing where CPU 26 provides address 04. The data stored in address 04 of memory 20 is d2. In this situation, the hit indicator indicates that this address does not match the address stored in line buffer 46, line buffer 46 being the only line buffer that contains valid data. The associated sequential indicator is a 1, indicating that the address provided by CPU 26 is the next sequential address. Note that the sequential access signal will be asserted at this point and data d2 accessed from memory 20 address 04. However, because this is a sequential access, the data stored in line buffer 46 is not modified and no additional data is stored in any of the other sline buffers. In this example it is assumed that the line buffer only stores one data value.

The next several rows are processed as the second row, where CPU 26 provides sequential addresses 08, 0C, and 10 via address bus 11. Each address has corresponding data d3, d4, and d5 in memory 20. Again, for each processing step, the hit indicator remains 0, indicating negation of the hit signal, and the sequential indicator is a 1, indicating assertion of sequential access signal. Note that through each sequential step line buffer 46 contains data d1, and no writes are made to any of the other line buffers. The sequential addresses are processed in compliance with the protocol set forth by interface state machine 44.

The next row indicates that CPU 26 again provides address 04. The data value of address 04 in memory 20 is d2, as above. In this situation, the hit indicator signal remains negated, and thus the hit indicator is still 0, because address 04 is not stored in one of the plurality of line buffers 46–47. However, the sequential access indicator is also negated to indicate that address 4 corresponds to a change in the program flow and is not a sequential address. Because address 4 is not a sequential address, interface state machine 44 determines that the data value corresponding to this address 4 should be stored in a line buffer 47 which has not yet been written. Therefore, data, d2 is stored in line buffer 47 and is also provided to CPU 26. At this point address 00 and associated data d1 are stored in line buffer 46; address 04 and associated data d2 are stored in line buffer 47.

Next address 08 is provided by CPU 26. There is no match of address 08 with any one of the plurality of line buffers 46–47, and therefore the hit indicator signal is negated and hit indicator is 0. However, the sequential access indicator signal is asserted because address 08 is next to address 04 in sequential processing flow. Therefore, the contents of line buffers 46 and 47 are not modified. Processing continues.

The next address provided by CPU 26 is 0C, and is provided to memory interface unit 22 via address bus 11. Address 0C has corresponding data value d4. Address 0C is a next sequential address to address 08. Address 0C is not stored in any one of the plurality of line buffers 46–47. Therefore, the sequential access signal is asserted and the hit indicator signal remains negated. Again, there is no need to modify the contents of the plurality of line buffers 46–47.

Following address 0C, CPU 26 provides address 00. Note that address 00 has corresponding data value d1 which is stored in memory 20 and has been written to line buffer 46. Now the hit indicator signal and therefore the hit indicator is 1. The sequential access signal is negated indicating that address 00 is not the next sequential address after 0C. Address 00 and associated data d1 are already stored in one of the plurality of line buffers 46–47, namely line buffer 46. No modification is made to the contents of line buffers 46–47 as the hit signal is asserted. Also, in response to the assertion of the hit signal, data d1 is provided by line buffer 46 via conductors 45 to multiplexer 50 and on to CPU 26 via bus 13. By storing address 00 and data d1 in line buffer 46, the data was available for provision to CPU 26 without the delay usually associated with a non sequential processing order.

Similarly, CPU 26 next provides address 04, the hit indicator and the sequential access signal are asserted to indicate that address 04 is both sequential to the previous address and address 04 along with data d2 are stored in one of the plurality of line buffers 46–47, namely line buffer 47. The data value d2 may be provided by either line buffer 46 through multiplexer 50 or directly by memory 20 via multiplexer 50 depending on an implementation of the present invention. The contents of line buffer 46 and the contents of line buffer 47 are not modified.

Next, a next sequential address 08 is provided by CPU 26. Therefore, the contents of line buffer 46–47 are not modified; see the reasons outlined above. The final row of FIG. 9 considers CPU 26 providing address 18. This address is not sequential and, therefore, reflects a disruption in the sequential operating flow in the program executed by CPU 26. As such, data associated with the access address is stored in one of the plurality of line buffers 46–47. In one embodiment of the present invention, interface state machine selectively determines which line buffer to access according to a least recently accessed scheme.

Memory interface unit 24 of the present patent application provides a method and apparatus which stores instructions which are branch targets. The selective storage operation is performed on the basis of the sequential nature of a program code being executed by CPU 26 and the addresses of previous instruction stores. Stated another way, data read from memory 20 is written into one of the plurality of line buffers 46–47 if and only if the instruction fetch is a non sequential processing flow operation and an address of the instruction fetch does not match an address stored in any one of the plurality of line buffers 46–47.

DESCRIPTION OF OPERATION OF MEMORY CONTROL UNIT

Memory control unit 22 provides control register bit field, logic, and a state machine which facilitate a programmable number of clocks for an initial access to an on-chip memory, such as memory 20. Specifically, the memory control unit 22 of the present patent application allows an external user to modify memory control signals to provide consistent access times across different frequencies of the system clock. Stated another way, memory control unit 22 allows memory control signals to be modified to optimize access time dynamically.

Figure 5:
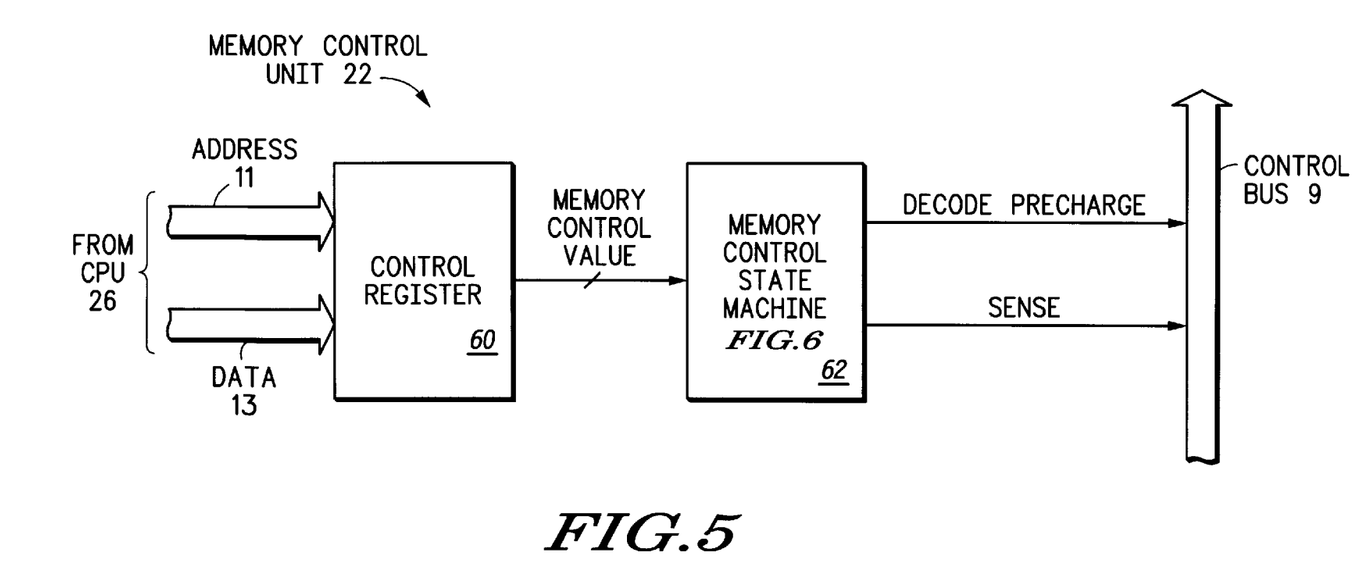
FIG. 5 illustrates, in block diagram form, a memory control unit of the data process of the present invention.

The functionality described above is implemented in memory control unit 22 illustrated in greater detail in FIG. 5. As illustrated in FIG. 5, CPU 26 provides address information via address bus 11 and data information via data bus 13 to control register 60. CPU 26 configures control register 60 to set control over a latency counter (not illustrated herein). In the present embodiment, control register 60 includes a plurality of bit fields. However, control register 60 may also be implemented using a single control bit. After control register 60 is configured, control register 60 provides a multi-bit memory control value signal to memory control state machine 62 which reflects a value programmed into control register 60. Memory control state machine 62 then uses the information provided by the memory control value signal to generate control signals for memory 20. The steps executed by memory control state machine 62 are illustrated in greater detail in FIG. 6.

Figure 6:
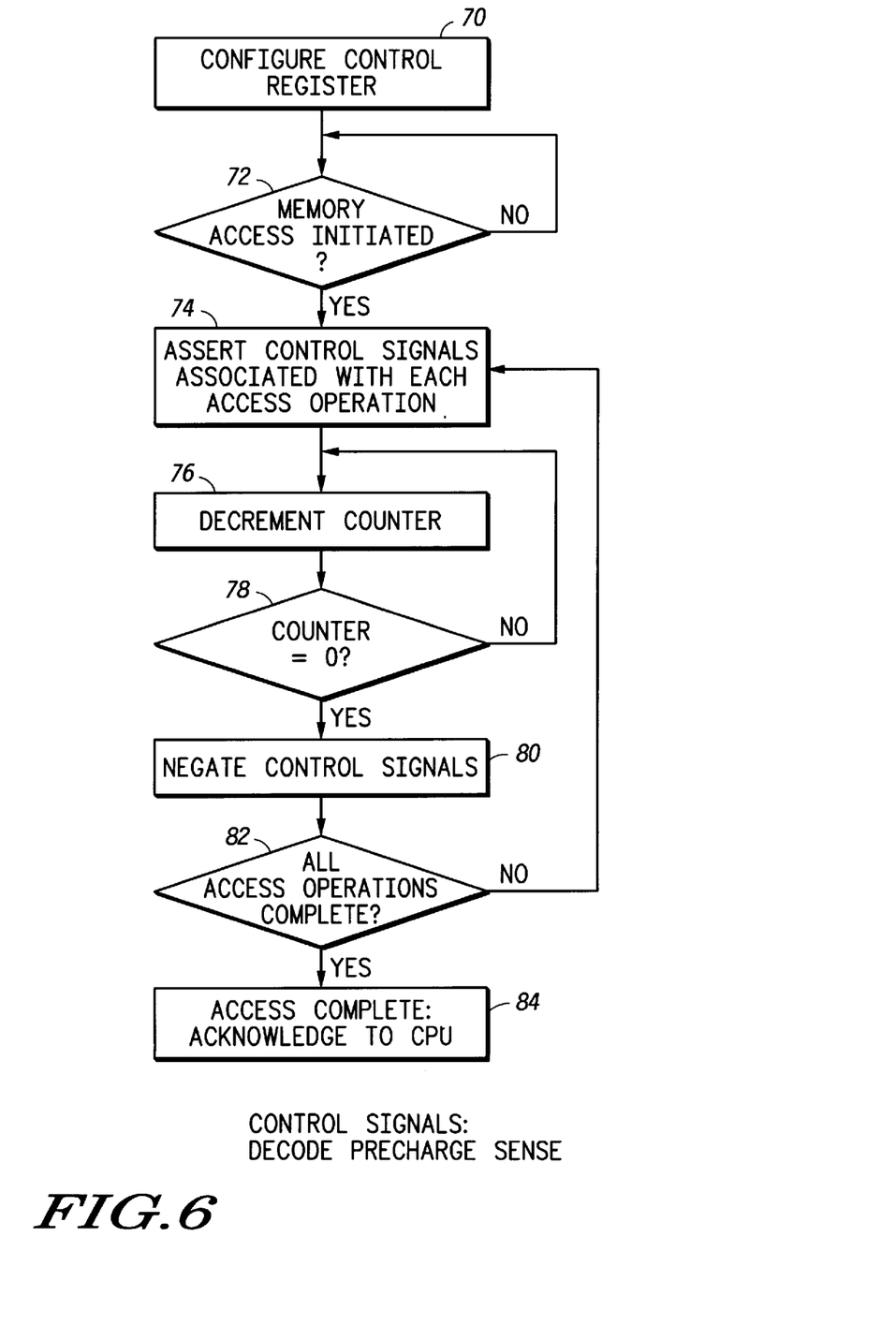
FIG. 6 illustrates, in flow diagram form, a series of steps executed by a memory control state machine of the memory control unit of the present invention.

In a step 70, control register 60 is configured. This step was previously discussed in greater detail. After control register 60 is configured, memory control state machine 62 determines whether or not an access to memory 20 has been initiated in a step 72. If not, memory control state machine 62 remains in step 72 until a memory access operation is initiated. If a memory access operation is initiated, memory control state machine 62 provides the control and logic necessary to assert a relevant control signal for each access operation in a step 74. Such access operations include a decode operation, a precharge operation, and a sense operation.

Next, in a step 76, a counter implemented within memory control state machine 62 is decremented. Then, it is determined whether or not the counter of memory control state machine 62 is equal to zero. If no, the counter is again decremented in a step 76. While the counter is still being decremented and is not equal to zero, the relevant control signal remains asserted for the access operation being executed. When the counter is equal to zero, memory control state machine 62 negates the relevant control signal which was previously asserted in a step 80.

Next, in a step 82, memory control state machine 62 determines whether or not all access operations have been completed. If not, memory control state machine 62 asserts a next relevant control signal and repeats each of step 74–82. If all access operations are completed, memory control state machine 62 provides an acknowledgment to CPU 26 that the memory access operation has been initiated and completed.

It should be noted that control register 60 is selectively programmable through CPU 26. The selective program ability allows the length of the control signals provided to access memory 20 to be selectively determined on a dynamic basis under software control. Therefore, CPU 26 may use a system clock with a higher frequency and still integrate and function together with memory 20 when memory 20 requires a slower frequency. By providing the control signals required by memory 20 at a rate which is usable by memory 20, the present invention provides for a greater flexibility and reuse of previously designed and proven devices external to a CPU.

It should be noted that in FIG. 5 of the present invention, the control signals utilized are decode, precharge and sense signals. While the signals are well known in the data processing art, selective and programmable control of the signals is not known. By allowing a user to programmably modify a length of time that each of these signals is asserted, the present invention allows the memory to be accessed to obtain valid data, while still allowing CPU 26 to be utilized at a highest possible frequency.

Figure 7:
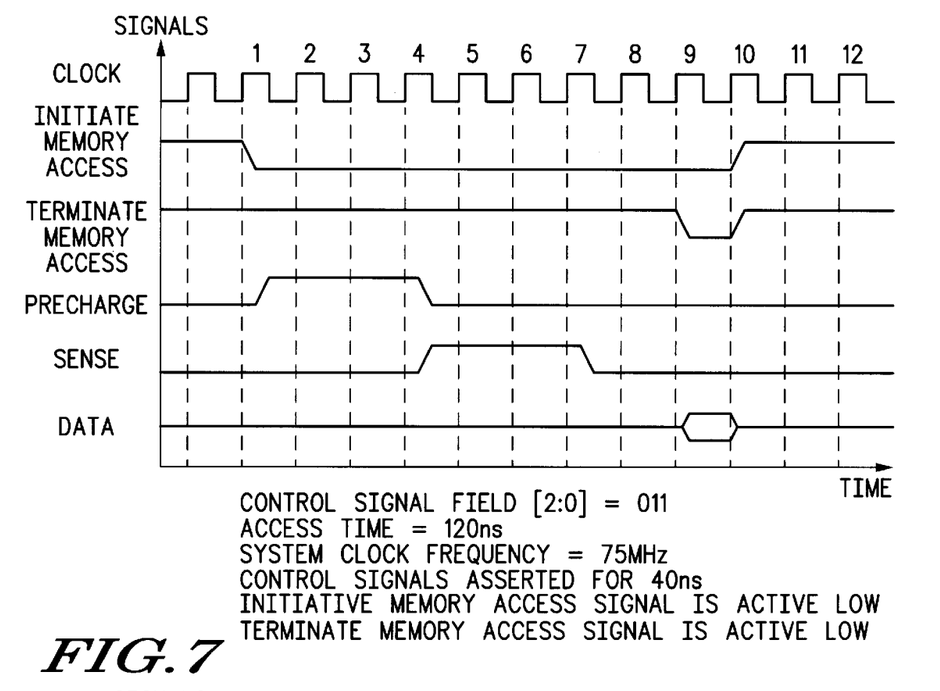
FIG. 7 illustrates, in timing diagram form, a first example of operation of one embodiment of the present invention.

An example of operation of memory control unit 22 of the present invention is illustrated in greater detail in FIG. 7. In FIG. 7, a clock signal is provided at a first line. At a first time cycle, an initiate memory access signal is asserted until a tenth timing cycle. It should be noted that the initiate memory access cycle may be a read enable signal or the like. A terminate memory access signal is asserted at the end of the memory operation. In this example, the memory access is terminated at the end of clock cycle 9. Note, that control register 60 has been programmed with the value of % 011.

Furthermore, memory 20 requires an access time of 120 nanoseconds. Furthermore, in the example of FIG. 7, a system clock frequency is 75 MHz and control signals for memory 20 are required to be asserted for a minimum period of 40 nanoseconds. By programming control register 60 such that it stores a value of % 011, the decode precharge signal is asserted from a falling edge of dock cycle 1 to a falling edge of clock cycle 4. Note, that if the precharge signal was tied to a frequency of the dock signal, the precharge would not be asserted for the minimum time required by memory 20. In a following line, the sense signal is asserted during a subsequent time and period and upon negation of the precharge signal for a period of time spanning from a falling edge of clock period 4 to a falling edge of clock period 7. Again note that the sense signal is asserted for a period of time which exceeds the minimum amount of time required by memory 20 for all control signals asserted thereto. However, note that the data is provided in a single timing cycle and does not adversely impact the operating frequency of CPU 26.

Figure 8:
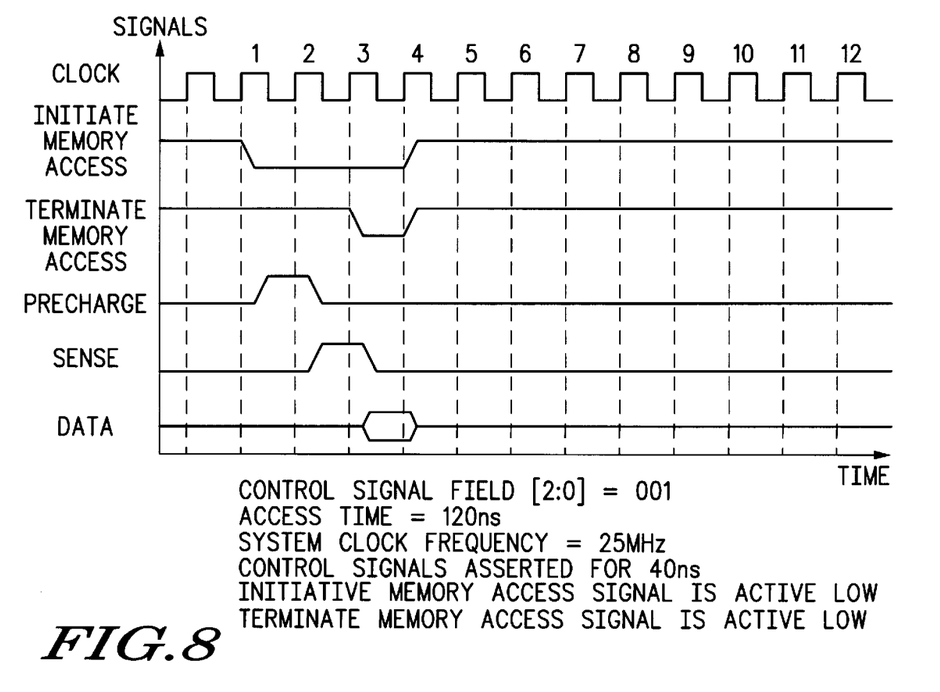
FIG. 8 illustrates, in timing diagram form, a second example of operation of the embodiment of the present invention.

FIG. 8 provides a second example in which control register 60 has been programmed with a value of % 001. Again, a time required to access a value from memory 20 is approximately 120 nanoseconds. In the example illustrated in FIG. 8, a system clock frequency is 25 MHz and control signals must remain asserted for 40 nanoseconds. In FIG. 8, a clock is provided at a system frequency of 25 MHz. The initiate memory access signal is asserted for a period of 3 clock cycles. Furthermore, note that the terminate memory access signal is asserted for a period of one clock cycle at the end of the initiate memory access signal. The precharge signal is asserted from a falling edge of a first dock cycle to a falling edge of a second clock cycle. The sense signal is asserted from a falling edge of the second clock cycle to a second edge of the third dock cycle.

Thus, it may be seen that the present invention provides programmable control of the control signals to a memory array. This allows the same memory to be used at different clock frequencies without incurring unnecessary idle clocks. That is, the same memory array could be accessed in two docks at 25 Mhz or three clocks at 33 Mhz. This is preferrable to accessing the memory in three clocks at both 25 Mhz and 33 Mhz, which costs an idle dock at 25 Mhz.

Also, programmable control of the control signals to a memory array allows a given memory array to operate at system clock frequencies which are higher than expected. In the absence of the present invention, control signals to the memory are a fixed function of the system clock. Consequently, at frequencies above a certain threshold the operations controlled by these signals are performed for a period of time which is too short for correct functionality of the memory. The invention allows software to modify the duration of the control signals to facilitate correct operation of the memory array at dock frequencies higher than expected.

Additionally, the present invention allows "porting" of "timing sensitive" software from external memory requiring a longer access time to a faster on-chip memory. Here porting involves the transfer of data from external memory to a resident memory on-chip and timing sensitive software indicates code which has been written and calculated to be processed at a specific frequency. Timing sensitive software often contains delays, loops, and branches which must occur within a predetermined timing relationship.

The implementation of the invention described herein is provided by way of example only. However, many other implementations may exist for executing the function described herein. While the present invention has been illustrated and described with reference to specific embodiments, further modifications and improvements will occur to those skilled in the art. It is to be understood therefore, that this invention is not limited to the particular forms illustrated and that the appended claims cover all modifications that do not depart from the scope of this invention.

We claim:

1. A peripheral control unit for controlling access time between a peripheral device and a central processing unit, the central processing unit having a first operating condition defined by a first frequency and a first duty cycle, the peripheral control unit comprising:

a timing selection means adapted to provide access timing control information; and a peripheral control state circuit adapted to provide a peripheral control signal to said peripheral device, said peripheral control state circuit adapted to receive said access timing control information from said timing selection means; and wherein in response to receiving said access timing control information corresponding to a first value, said peripheral control signal is held active for a first number of clock cycles at the first frequency and the first duty cycle; and wherein in response to receiving said access timing control information corresponding to a second value, said peripheral control signal is held active for a second number of clock cycles at the first frequency and the first duty cycle.

2. A peripheral control unit as in claim 1, wherein said peripheral device is a memory device.

3. A peripheral control unit as in claim 2 wherein said peripheral control signal comprises:

a decode portion for control of address decoding in the memory device;

a precharge portion for control of precharge operation within the memory device; and a sense portion for control of sense operation within the memory device.

4. A peripheral control unit as in claim 1 wherein said timing selection means is a control register and said access timing control information is provided to said peripheral control state circuit by way of a plurality of access timing control signals.

5. A method of controlling peripheral access time in a data processing system, said data processing system having a peripheral interface unit having a first control register and a peripheral access timing control circuit, the data processing system having a first operating frequency and the first duty cycle, said method comprising the steps of:

determining a first access timing for peripheral access;

providing a first value corresponding to said first access timing to said first control register, wherein the first value indicates a first number of clock cycles to accomplish the first access timing at the first operating frequency and the first duty cycle;

said peripheral access timing control circuit receiving a first timing signal corresponding to said first value from said first control register; and in response to receiving said first timing signal, said peripheral access timing control circuit providing peripheral operation control signals; and wherein said peripheral operation control signals are held active for the first number of clock cycles corresponding to said first value at the first operating frequency and first duty cycle.

6. A method as in claim 5, further comprising the steps of:

determining a second access timing for said peripheral access;

providing a second value corresponding to said second access timing to said first control register, wherein the second value indicates a second number of clock cycles to accomplish the second access timing at the first operating frequency and the first duty cycle;

said peripheral access timing control circuit receiving a second timing signal corresponding to said second value from said first control register;

in respond to receiving said second timing signal, said peripheral access timing control circuit providing peripheral operation control signals; and wherein said peripheral operation control signals are held active for the second number of clock cycles corresponding to said second value at the first operating frequency and first duty cycle.

7. A method of programming access time in a data processor, the data processor having an operating frequency, the method comprising the steps of:

the data processor initiating a first read operation from a peripheral devices, the peripheral device having a first predetermined access time;

determining a first timing selection for the read operation based on the operating frequency of the data processor and the first predetermined access time;

determining a first number of access clock cycles in response to determining the first timing selection;

holding a peripheral control signal active for the first number of access clock cycles at the operating frequency, wherein the peripheral control signal is provided to the peripheral device;

the data processor initiating a second read operation from a second peripheral device, the second peripheral device having a second predetermined access time;

determining a second timing selection from the second peripheral device base on the operating frequency of the data processor and second the predetermined access time;

determining a second number of access clock cycles in response to determining the second timing selection, wherein the peripheral control signal is provided to the second peripheral device; and holding the peripheral control signal active for the second number of access clock cycles at the operating frequency.

8. The method of claim 7, wherein the step of initiating a first read operation comprises:

determining if a sequential access signal is active;

accessing sequential addresses when the sequential access signal is active; and sequentially reading data from the peripheral device.

\* \* \* \* \*

UNITED STATES PATENT AND TRADEMARK OFFICE
CERTIFICATE OF CORRECTION

PATENT NO. : 6,076,170
DATED : June 13, 2000
INVENTOR(S) : Khoi Van Dinh et al.

It is certified that error appears in the above-identified patent and that said Letters Patent is hereby corrected as shown below:

Claim 7, column 12, line 66:
  Change the first "devices" to -- device--;

Claim 7, column 13, line 15:
  After device change "base" to -- based--.

Signed and Sealed this

First Day of May, 2001

Attest:

NICHOLAS P. GODICI

Attesting Officer

Acting Director of the United States Patent and Trademark Office